B. FRONEK.
HAT FASTENER.
APPLICATION FILED FEB. 6, 1920.

1,347,267.

Patented July 20, 1920.

Inventor,
Bohumil Fronek.

UNITED STATES PATENT OFFICE.

BOHUMIL FRONEK, OF CHICAGO, ILLINOIS.

HAT-FASTENER.

1,347,267.　　　　Specification of Letters Patent.　　Patented July 20, 1920.

Application filed February 6, 1920. Serial No. 356,681.

*To all whom it may concern:*

Be it known that I, BOHUMIL FRONEK, a citizen of the United States, residing at Chicago, in the county of Cook and State of Illinois, have invented certain new and useful Improvements in Hat-Fasteners, of which the following is a specification.

This invention relates to improvements in hat fasteners and one of the objects of the invention is to provide an improved device of this character which will be simple, durable and cheap in construction, compact and efficient in operation, and by the use of which the ordinary hat pin may be dispensed with.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention and in which:

Figure 1:
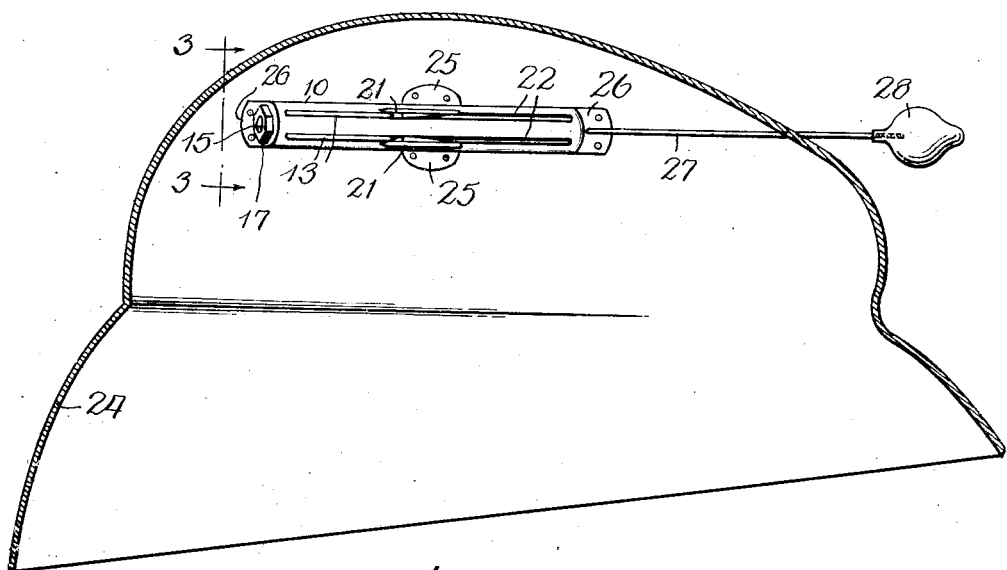
Figure 1 is a vertical sectional view of a hat having a fastener applied thereto and constructed in accordance with the principles of this invention.
Figure 2:
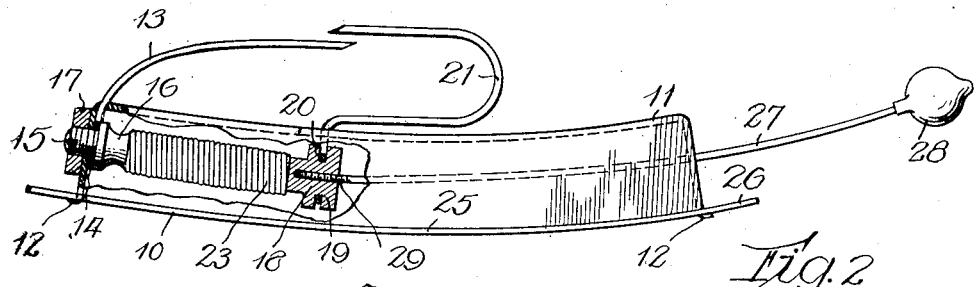
Fig. 2 is an enlarged view in side elevation, partly in section and partly broken away of the fastener.
Figure 3:
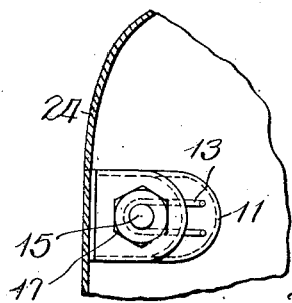
Fig. 3 is a detail view as taken on line 3—3, Fig. 1.

Referring more particularly to the drawing the numeral 10 designates a supporting base having connected thereto a casing 11, the two parts being secured together in any suitable manner such as by means of ears or lugs 12 on the casing which pass through openings in the base 10 and are flanged thereagainst. The base and the casing may be constructed of any suitable material and of any size and configuration but are preferably elongated and of a slightly curved configuration. Connected with one of the end walls of the casing is a hair engaging prong or pin 13 which may be formed of any suitable material, preferably bent upon itself to form spaced prongs and a loop 14. The prong 13 may be secured in position in any suitable manner, preferably by projecting into the casing 11 in a position to receive a threaded stem 15 having a head 16 which abuts the prong 13 on the inner side of the casing and the stem 15 passes through a suitable opening in the end wall of the casing to receive a nut 17 so that when the nut is screwed upon the stem 15 so as to engage the end wall of the casing, it will cause the prong 13 to be clamped between the head 16 and the casing wall. Slidable within the casing is an element 18 preferably provided with a circumferential groove 19 into which the body portion 20 of a hair engaging prong or pin 21 is adapted to be seated. The prongs 13—21 are bent so as to oppose each other and the casing 11 is provided with slots 22 through which the prong 21 passes so that when the element 18 is moved backward and forward in the casing the slots 22 will permit the prong 21 to be shifted with respect to the prong 13.

An elastic element 23 in the form of a coiled spring is provided for controlling the movement of the element 18 and prong 21 in one direction. One end of this spring is anchored to the element 18, and the other end is secured to the head 16, and the spring is at all times housed within and protected by the casing in any position of the prongs with respect to each other.

The device is secured in position within the hat 24 in any suitable manner, preferably by sewing the same therein, the threads passing through openings in the ears 25—26.

All of the parts thus described are arranged within the hat and the prong 21 is adapted to be shifted from the outside of the hat in any suitable manner such as by means of a pin 27 of a considerable length, the head 28 of which may be detachably connected to the end of the pin and is arranged on the outside of the hat. The pin penetrates the body of the hat and is provided with a threaded extremity 29 which engages in a threaded opening in the element 18 so that the pin may be readily detached when desired.

The casing 11 and the base 10 are shaped to conform with the contour of the hat.

It will be manifest that with this improved fastener and when it is desired to secure the hat in position, all that is necessary is to grasp the head 28 of the pin 27 and shift the element 18 in the casing 11 against the tension of the spring 23. This will separate the prongs. When the hat is positioned the pin 27 may be released and the spring 23 will then draw the prong 21 into coöperative relation with the prong 13 and cause these prongs to grip or embed themselves in the hair. To release the device, obviously the pin 27 may be withdrawn to shift the element 18 and separate the prongs.

While the preferred form of the invention has been herein shown and described, various changes may be made in the details of construction and in the combination and arrangement of the several parts within the scope of the claims without departing from the spirit of this invention.

What is claimed as new is:—

1. A hat fastener embodying a body portion, a hair engaging prong connected therewith and extending therefrom, a coöperating hair engaging prong movably mounted upon the said body portion, means tending normally to move the prongs toward each other into coöperative relation, an extended casing completely housing the said means in any position of the prongs with respect to each other, and means whereby the prongs may be separated against the stress of the first recited means.

2. A hat fastener embodying a body portion, a hair engaging prong connected therewith and extending therefrom, a coöperating hair engaging prong movably mounted upon the said body portion, means tending normally to move the prongs toward each other into coöperative relation, an extended casing completely housing the said means in any position of the prongs with respect to each other, all of said parts being disposed within the hat, and means whereby the prongs may be separated against the stress of the first recited means and from the outside of the hat.

3. A hat fastener embodying a body portion, a hair engaging prong connected therewith and extending therefrom, a coöperating hair engaging prong movably mounted upon the said body portion, means tending normally to move the prongs toward each other into coöperative relation, all of said parts being disposed within the hat, and means whereby the prongs may be separated against the stress of the first recited means and from the outside of the hat, the last recited means embodying an operating element extending through the body of the hat to the outside therof and having a detachable connection with the shiftable prong.

4. A hat fastener embodying a body portion, a hair engaging prong connected therewith and extending therefrom, a coöperating hair engaging prong movably mounted upon the said body portion, means tending normally to move the prongs toward each other into coöperative relation, an extended casing completely housing the said means in any position of the prongs with respect to each other, means whereby the prongs may be separated against the stress of the first recited means, and means whereby the said fastener may be secured to the hat.

5. A hat fastener embodying a casing, a hair engaging prong connected thereto and extending therefrom, a shiftable element within the casing, said casing having an opening in one wall extending lengthwise thereof, an opposed hair engaging prong connected with the said element and extending through the said opening whereby when the said element is shifted the prong connected therewith will be moved toward or away from the other prong, an elastic element within the casing and tending normally to cause the prongs to assume an operative relation, one end of said elastic element being connected with the first said element and the other end being anchored to the casing and means connected with the movable element whereby the latter may be moved against the stress of the said elastic element to separate the prongs.

6. A hat fastener embodying a casing, a hair engaging prong connected thereto and extending therefrom, a shiftable element within the casing, said casing having an opening in one wall extending lengthwise thereof, an opposed hair engaging prong connected with the said element and extending through the said opening whereby when the said element is shifted the prong connected therewith will be moved toward or away from the other prong, an elastic element within the casing and tending normally to cause the prongs to assume an operative relation, one end of said elastic element being connected with the first said element and the other end being anchored to the casing, all of said parts being adapted to be located within a hat, and an operating bar extending beyond the casing and detachably connected with the shiftable element, whereby one end of the said bar will be maintained.

7. A hat fastener embodying a casing, a hair engaging prong connected thereto and extending therefrom, a shiftable element within the casing, said casing having an opening in one wall extending lengthwise thereof, an opposed hair engaging prong connected with the said element and extending through the said opening whereby when the said element is shifted the prong connected therewith will be moved toward or away from the other prong, an elastic element within the casing and tending normally to cause the prongs to assume an operative relation, one end of said elastic element being connected with the first said element and the other end being anchored to the casing, all of said parts being adapted to be located within a hat, an operating bar extending beyond the casing and detachably connected with the shiftable element, whereby one end of the said bar will be maintained outside of the hat and the bar may be passed through the body of the hat and detachably engage the said shiftable element, and means connected with the casing whereby the same may be secured to the hat.

In testimony whereof I have signed my name to this specification on this 31st day of January, A. D. 1920.

BOHUMIL FRONEK.